United States Patent
Logan et al.

(10) Patent No.: US 9,584,564 B2
(45) Date of Patent: Feb. 28, 2017

(54) SYSTEMS AND METHODS FOR INTEGRATING LIVE AUDIO COMMUNICATION IN A LIVE WEB EVENT

(75) Inventors: Dorian Logan, London (GB); Kenneth Winter, London (GB)

(73) Assignee: BrightTALK Ltd., London (GB)

( * ) Notice: Subject to any disclaimer, the term of this patent is extended or adjusted under 35 U.S.C. 154(b) by 1056 days.

(21) Appl. No.: 12/151,768

(22) Filed: May 8, 2008

(65) Prior Publication Data

US 2009/0164876 A1   Jun. 25, 2009

Related U.S. Application Data

(63) Continuation-in-part of application No. 12/004,532, filed on Dec. 21, 2007, now Pat. No. 9,015,570.

(51) Int. Cl.
*G06F 17/27* (2006.01)
*H04L 29/06* (2006.01)
*G06F 17/30* (2006.01)

(52) U.S. Cl.
CPC .... *H04L 65/4015* (2013.01); *G06F 17/30056* (2013.01); *H04L 65/403* (2013.01); *H04L 65/4076* (2013.01)

(58) Field of Classification Search
CPC ......... G06F 17/30056; G06F 17/30038; G06F 17/30873; G06F 2216/15
USPC ....... 715/230–233, 243, 250, 277, 704, 716, 715/719, 720, 727, 730
See application file for complete search history.

(56) References Cited

U.S. PATENT DOCUMENTS

| | | | |
|---|---|---|---|
| 5,565,923 A * | 10/1996 | Zdepski | 375/240.26 |
| 6,442,598 B1 | 8/2002 | Wright et al. | |
| 6,728,753 B1 * | 4/2004 | Parasnis et al. | 709/203 |
| 6,760,749 B1 * | 7/2004 | Dunlap et al. | 709/204 |
| 6,774,926 B1 | 8/2004 | Ellis et al. | |
| 7,050,603 B2 * | 5/2006 | Rhoads et al. | 382/100 |
| 7,142,250 B1 * | 11/2006 | Black | 348/515 |
| 7,328,239 B1 * | 2/2008 | Berberian et al. | 709/204 |
| 7,369,515 B2 * | 5/2008 | Salesky et al. | 370/260 |
| 7,412,533 B1 * | 8/2008 | Johnson et al. | 709/231 |
| 7,751,347 B2 * | 7/2010 | Giroti | 370/260 |
| 7,865,567 B1 | 1/2011 | Hendricks et al. | |
| 8,446,846 B1 * | 5/2013 | Saleem et al. | 370/260 |
| 8,514,762 B2 * | 8/2013 | Du Hart et al. | 370/312 |
| 9,015,570 B2 | 4/2015 | Rance et al. | |
| 9,032,441 B2 | 5/2015 | Rance et al. | |
| 2001/0047516 A1 | 11/2001 | Swain et al. | |
| 2002/0016858 A1 | 2/2002 | Sawada et al. | |

(Continued)

OTHER PUBLICATIONS

U.S. Appl. No. 12/004,532, Peter Rance, System and Method for Providing a Web Event Channel Player, filed Dec. 21, 2007.

(Continued)

*Primary Examiner* — Wilson Tsui
(74) *Attorney, Agent, or Firm* — Carr & Ferrell LLP

(57) ABSTRACT

A system, method, and computer program for integrating live audio communication in a web event is provided. In exemplary embodiments, live audio data is received from one or more presenters. The live audio data is then encoded to create a formatted audio stream. The formatted audio stream may be synchronized with presentation events to generate the live web event by injecting control data for the presentation events. A combined formatted stream may be distributed to one or more users.

17 Claims, 8 Drawing Sheets

(56) References Cited

U.S. PATENT DOCUMENTS

| | | | |
|---|---|---|---|
| 2002/0036694 A1 | 3/2002 | Merril | |
| 2002/0100061 A1 | 7/2002 | Tsusaka et al. | |
| 2002/0103696 A1 | 8/2002 | Huang et al. | |
| 2002/0104096 A1* | 8/2002 | Cramer | H04N 7/17318 725/113 |
| 2002/0116297 A1 | 8/2002 | Olefson | |
| 2002/0120939 A1 | 8/2002 | Wall et al. | |
| 2002/0132611 A1 | 9/2002 | Immonen et al. | |
| 2002/0198943 A1 | 12/2002 | Zhuang et al. | |
| 2003/0034999 A1* | 2/2003 | Coughlin et al. | 345/738 |
| 2003/0124502 A1* | 7/2003 | Chou | G09B 5/00 434/350 |
| 2003/0158816 A1 | 8/2003 | Rouse | |
| 2003/0200001 A1* | 10/2003 | Goddard | 700/94 |
| 2004/0032424 A1 | 2/2004 | Florschuetz | |
| 2004/0153504 A1 | 8/2004 | Hutchinson et al. | |
| 2004/0193683 A1 | 9/2004 | Blumofe | |
| 2004/0225728 A1 | 11/2004 | Huggins et al. | |
| 2004/0243922 A1 | 12/2004 | Sirota et al. | |
| 2005/0076387 A1 | 4/2005 | Feldmeier | |
| 2005/0125453 A1 | 6/2005 | Rozack | |
| 2005/0160367 A1 | 7/2005 | Sirota et al. | |
| 2006/0104347 A1* | 5/2006 | Callan et al. | 375/240.01 |
| 2006/0111903 A1 | 5/2006 | Kemmochi et al. | |
| 2006/0179454 A1 | 8/2006 | Shusman | |
| 2006/0195353 A1 | 8/2006 | Goldberg et al. | |
| 2007/0044133 A1 | 2/2007 | Hodecker | |
| 2007/0078768 A1 | 4/2007 | Dawson | |
| 2007/0118396 A1 | 5/2007 | Matz et al. | |
| 2008/0195743 A1 | 8/2008 | Brueck et al. | |
| 2008/0196079 A1 | 8/2008 | Lee et al. | |
| 2008/0282293 A1 | 11/2008 | Frechter et al. | |
| 2009/0019374 A1 | 1/2009 | Logan et al. | |
| 2009/0024923 A1 | 1/2009 | Hartwig et al. | |
| 2009/0037520 A1 | 2/2009 | Loffredo | |
| 2009/0055385 A1 | 2/2009 | Jeon et al. | |
| 2009/0070407 A1 | 3/2009 | Castle et al. | |
| 2009/0164875 A1 | 6/2009 | Rance et al. | |
| 2009/0286509 A1 | 11/2009 | Huber et al. | |
| 2010/0058410 A1 | 3/2010 | Rance et al. | |
| 2010/0088126 A1 | 4/2010 | Iaia et al. | |
| 2010/0293048 A1 | 11/2010 | Singolda et al. | |
| 2012/0066259 A1 | 3/2012 | Huber et al. | |
| 2012/0158888 A1 | 6/2012 | Rance et al. | |
| 2012/0191582 A1 | 7/2012 | Rance et al. | |

OTHER PUBLICATIONS

U.S. Appl. No. 12/231,493, Peter Rance, System and Method for Self Management of a Live Web Event, filed Sep. 2, 2008.
U.S. Appl. No. 12/969,443, Peter Rance, System and Method for Distributing Web Events Via Distribution Channels, filed Dec. 15, 2010.
U.S. Appl. No. 13/011,652, Peter Rance, Lead Generation for Content Distribution Service, filed Jan. 21, 2011.
Final Office Action, Oct. 17, 2014, U.S. Appl. No. 12/969,443, filed Dec. 15, 2010.
Office Action, Jan. 21, 2011, U.S. Appl. No. 12/004,532, filed Dec. 21, 2007.
Final Office Action, Aug. 8, 2011, U.S. Appl. No. 12/004,532, filed Dec. 21, 2007.
Advisory Action, Oct. 19, 2011, U.S. Appl. No. 12/004,532, filed Dec. 21, 2007.
Office Action, Jun. 7, 2011, U.S. Appl. No. 12/231,493, filed Sep. 2, 2008.
Final Office Action, Nov. 16, 2011, U.S. Appl. No. 12/231,493, filed Sep. 2, 2008.
Advisory Action, Jan. 26, 2012, U.S. Appl. No. 12/231,493, filed Sep. 2, 2008.
Office Action, Jul. 6, 2013, U.S. Appl. No. 12/231,493, filed Sep. 2, 2008.
Final Office Action, Aug. 1, 2013, U.S. Appl. No. 12/231,493, filed Sep. 2, 2008.
Office Action, Oct. 11, 2012, U.S. Appl. No. 12/969,443, filed Dec. 15, 2010.
Final Office Action, Jun. 3, 2013, U.S. Appl. No. 12/969,443, filed Dec. 15, 2010.
Advisory Action, Aug. 13, 2013, U.S. Appl. No. 12/969,443, filed Dec. 15, 2010.
Office Action, Dec. 16, 2013, U.S. Appl. No. 12/969,443, filed Dec. 15, 2010.
Office Action, Oct. 15, 2012, U.S. Appl. No. 13/011,652, filed Jan. 21, 2011.
Final Office Action, Aug. 13, 2013, U.S. Appl. No. 13/011,652, filed Jan. 21, 2011.
Notice of Allowance, Dec. 12, 2013, U.S. Appl. No. 13/011,652, filed Jan. 21, 2011.
Non-Final Office Action, Apr. 8, 2014, U.S. Appl. No. 12/004,532, filed Dec. 21, 2007.
Notice of Allowance, Dec. 3, 2014, U.S. Appl. No. 12/004,532, filed Dec. 21, 2007.
Non-Final Office Action, Mar. 25, 2014, U.S. Appl. No. 12/231,493, filed Sep. 2, 2008.
Notice of Allowance, Oct. 15, 2014, U.S. Appl. No. 12/231,493, filed Sep. 2, 2008.
Final Office Action, Dec. 2, 2015, U.S. Appl. No. 12/969,443, filed Dec. 15, 2010.
Notice of Allowance, Apr. 8, 2016, U.S. Appl. No. 12/969,433, filed Dec. 15, 2010.
Final Office Action, Oct. 17, 2014, U.S. Appl. No. 12/969,433, filed Dec. 15, 2010.
Office Action, May 21, 2015, U.S. Appl. No. 13/011,652, filed Jan. 21, 2011.
Final Office Action, Jan. 14, 2016, U.S. Appl. No. 13/011,652, filed Jan. 21, 2011.
Advisory Action, Apr. 20, 2016, U.S. Appl. No. 13/011,652, filed Jan. 21, 2011.
Notice of Allowance, Nov. 28, 2016, U.S. Appl. No. 13/011,652, filed Jan. 21, 2011.

* cited by examiner

SYSTEMS AND METHODS FOR INTEGRATING LIVE AUDIO COMMUNICATION IN A LIVE WEB EVENT

CROSS-REFERENCE TO RELATED APPLICATIONS

The present application is a continuation-in-part application and claims the benefit of U.S. patent application Ser. No. 12/004,532, filed Dec. 21, 2007, entitled, "System and Method for Providing a Web Event Channel Player," now U.S. Pat. No. 9,015,570, issued Apr. 21, 2015, which is hereby incorporated by reference.

BACKGROUND

Field of the Invention

The present invention relates generally to web events, and more particularly to systems and methods for integrating audio communication in a live web event.

Background Art

Using the Internet to distribute videos is becoming increasingly prevalent. For example, YouTube allows a distributor to embed pre-recorded videos within a webpage. Typically, the pre-recorded videos are embedded by inserting a piece of code for each video. The code will provide a link to the video when activated.

In alternative embodiments, the distributor may upload pre-recorded videos to a content provider. The content provider may then provide a list of the uploaded pre-recorded videos on an associated website. Viewers may then access the pre-recorded videos via the associated website.

Furthermore, web conferencing and presentations are also increasing in popularity. Typically, participants will schedule a conference or presentation time. At the predetermined time, the participants will access a particular website or link. Subsequently, one or more of the presenters will then present or moderate the conference. Typically, these conferences are not recorded for playback and users can only listen, but not provide input.

In further conferencing embodiments, a telephone conference may be utilized. Typically, participants will schedule the telephone conference and set up a conference bridge. At the predetermined time, the participants will call into the phone bridge and have a discussion. Disadvantageously, telephone conference may have audio latency issues and audio signals tend to be monoaural since a telephone device is, itself, monoaural.

As such, web conferences and telephone conferences have traditionally been used as two distinct and separate forms of conferencing. Recently, conferences have been used whereby a web browser is used to share visuals, such as slides, and participants use conference phones to chat via a separate phone line. Disadvantageous, these conferences require all participants to be connected via a telephone.

SUMMARY OF THE INVENTION

A system, method, and computer program for integrating live audio communication in a live web event is provided. In a method according to one embodiment, live audio data is received from one or more presenters. The live audio data is encoded in order to create a formatted audio stream optimized for network distribution. The formatted audio stream is then synchronized with presentation events by injecting control data into the formatted audio stream. In some embodiments, the control data may be injected into the formatted audio stream for controlling presentation events such as image updates, audience feedback, and other presentation events of the live web event. The live web event may be distributed to one or more subscribers.

DESCRIPTION OF EXEMPLARY EMBODIMENTS

Embodiments of the present invention provide systems and methods for integrating live audio communications and presentation events in a live web event. In exemplary embodiments, live audio data is received from one or more presenters. The live audio data is then encoded into a formatted audio stream and synchronized with one or more presentation events by injecting control data associated with the presentation event into the formatted audio stream to create the live web event. These web events may comprise any event occurring on a network such as, for example, a presentation including a slide show that is synchronized with the live audio. In exemplary embodiments, the control data controls aspects of the web event such as, images or slide changes and display of audience feedback. As such presentation events may comprise image changes (e.g., slide change) and audience feedback (e.g., audience questions, audience votes, applause).

Figure 1:
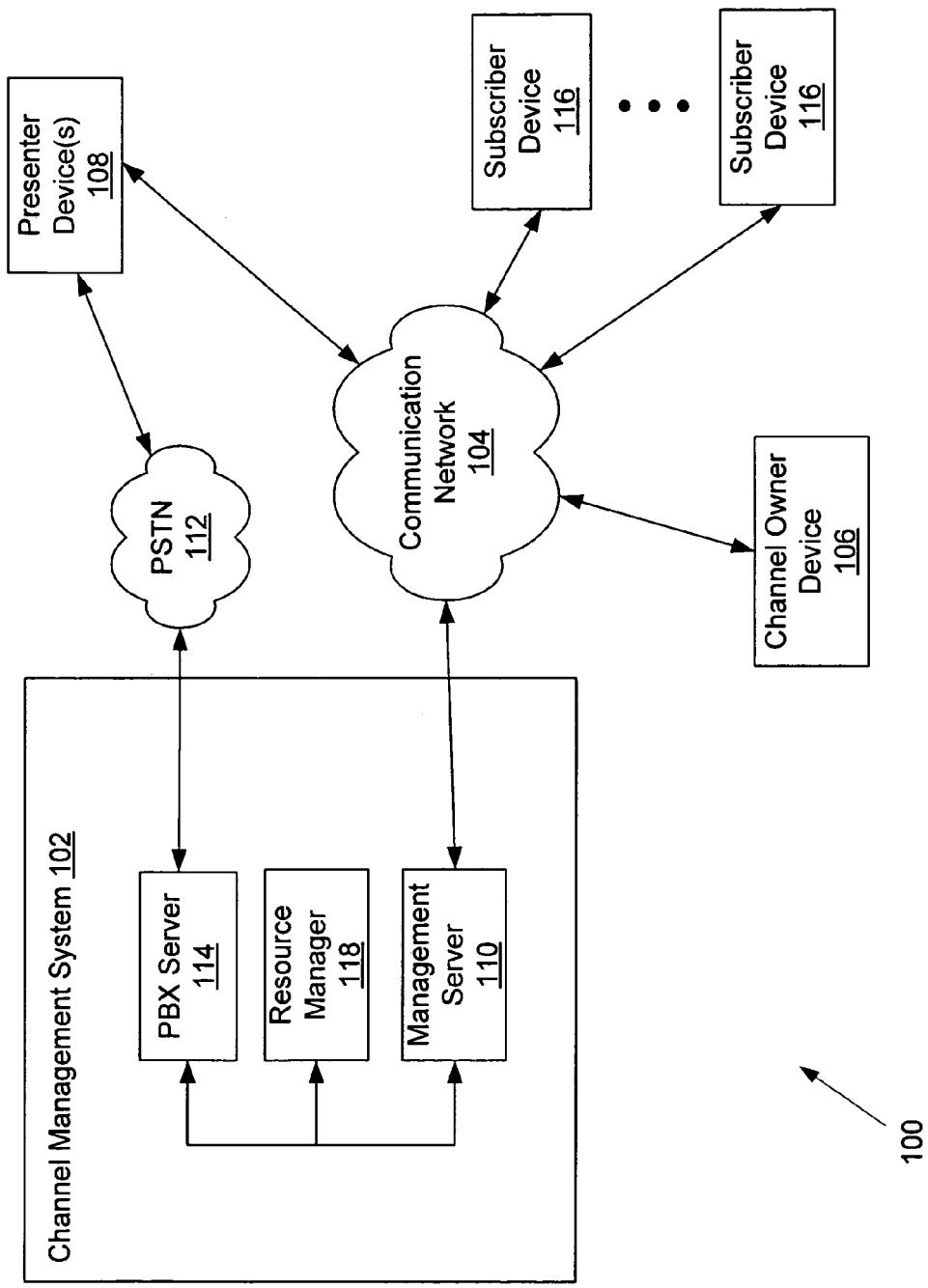
FIG. 1 is a diagram of an exemplary environment for integrating phone communication in a web event.

Referring now to FIG. 1, an exemplary environment 100 for integrating live audio communication and presentation events in a live web event is shown. The exemplary environment 100 comprises a channel management system 102 in communication via a communication network 104 to a channel owner device 106. The communication network 104 may comprise the Internet, wide area network, and/or local area network.

The channel owner device 106 may comprise any computing device of a channel owner configured to disseminate information. Typically, a channel provided by the channel owner may be directed to a particular subject matter that is associated with the channel owner of the channel owner device 106. A channel owner may comprise any entity that desires to disseminate information. For example, an investment company may provide a channel that is directed to mutual fund and stock investment events. In some embodiments, a channel may be associated with more than one channel owner or a channel owner may be associated with more than one channel.

In exemplary embodiments, the channel owner embeds a code associated with the channel player in a website owned, provided by, or associated with the channel owner via the channel owner device 106. The code comprises one or more instructions executable by a processor. According to exemplary embodiments, access to the channel player is provided by embedding a piece of software code (e.g., single line of code) within a webpage where channel player access is desired. This single piece of software code will activate an instance of the channel player on a user's computing device (e.g., subscriber device 116), which will provide access to the channel provided by the channel owner device. It should be noted that any number of users may activate the code to bring up an instance of the channel player on their respective computing devices. Each user will then have access to the channel and have independent control over what content to view (e.g., which events of the channel to access).

In an alternative embodiment, users may activate a channel player via a link or code on a website associated with the channel management system 102, on a website that is not owned, provided by, or associated with the channel owner (i.e., a non-channel owner), or be directed to a stand-alone version of the channel player. In this latter embodiment, the code is not embedded within a webpage associated with the channel owner. Instead, the channel player may be accessed, for example, by accessing a link associated with a channel management system 102 website or activating a link which directs the user to the stand-alone channel player. This link may be provided, according to one embodiment, in a communication from the channel owner device 106 to users (e.g., an e-mail message), such as audience members comprising the one or more second users participating in a presentation discussed herein. The stand-alone channel player may comprise a program that installs on a computing device (e.g., iPod, PDA, etc.) and is executed outside of a web browser. Alternately, the code may comprise JavaScript which calls the management server 110 to launch the channel player.

Accordingly, all web events (e.g., webcasts) of the channel may be under the control of the channel owner and/or the channel owner device 106. As such, the channel owner may arrange for one or more presenters via their associated presenter devices 108 to present events on the channel owner's channel. The presenter devices 108 may provide images, such as slides and videos via the communication network 104 to a management server 110 of the channel management system 102 prior to or during the event. The management server 110 will be discussed in more details in connection with FIG. 2 below.

The presenter may also provide live audio (e.g., commentary during the event). In one embodiment, the audio is provided via the communication network 104 (e.g., VoIP). In an alternative embodiment, the audio is provided via a phone call conducted over a public switched telephone network (PSTN) 112. In this embodiment, the audio is received by a private branch exchange (PBX) server 114 of the channel management system 102. In yet another embodiment, the audio may be provided via a video. In this embodiment, the audio may not be live. One or more presenters may disseminate information to one or more users (i.e., subscribers) via the web event. For example, each presenter may utilize a feed to provide audio data, which is then encoded into a formatted audio stream which may be synchronized with control data to generate the web event. The live audio and control data received by the channel management system 102 may be synchronized by the management server 110 as will be described further below.

The exemplary PBX server 114 may be configured to function as a conference bridge. By using the conference bridge, a plurality of presenters on a same event can hear each other on the telephone system. In some embodiments, one or more presenters may call into the PBX server 114 to provide the live audio during the web event (e.g., webcast). The live audio may, according to exemplary embodiments, be received via PSTN, VoIP (e.g., SIP G.711), or a combination of PSTN and VoIP, as discussed herein. In a further embodiment, the PBX server 114 is enabled to receive high-definition audio and to forward the received high-definition audio onward to the management server 110 for processing.

In some embodiments, the PBX server 114 may receive audio from a plurality of presenters and provide each stream of audio from each presenter to the management server 110 via a separate audio channel. That is, each presenter's audio feed is individually sourced. As a result, monoaural presenter feeds may be combined into a stereo mix by the management server 110.

In exemplary embodiments, one or more of the presenters are associated with a computing device (i.e., presenter device 108) from which control over images or videos during the event may be enabled. In these embodiments, the computing device will comprise a channel application which controls, for example, slide changes during the live event. Control data associated with these controls as well as other data may then be injected into the formatted audio stream as will be discussed further below.

The environment 100 also comprises a plurality of subscriber devices 116 associated with users or subscribers. These subscribers each subscribe to one or more channels associated with the channel management system 102 and/or the channel owner. Once subscribed, the subscriber will have access to events within the subscribed-to channel via their computing device. Thus, for example, the subscriber can access archived past events and view live events via a browser application on their subscriber device 116. The subscriber device 116 may also access a list of future, planned events. According to some embodiments, the subscriber may receive communications from the channel owner regarding future events.

The channel management system 102 may also comprise a resource manager 118. In exemplary embodiments, the resource manager 118 is configured to manage pools of resources. These pools of resources may comprise a group of servers or modules, each of which may provide the same service for an application (e.g., a group of media encoders, slide converters, transcoders). These servers may be real or virtual. In some embodiments, each of the resource (e.g., server or module) may be allocated to a specific process at a time for a single user.

The exemplary resource manager 118 may monitor the pool of resources in order to allocate resources. For example, if there are twenty media encoders, twelve media encoders are allocated and currently encoding, and three media encoders are in an error state, then five media encoders are available. Thus, when a request for a media encoder is received by the channel management system 102, the resource manager 118 receives the request and allocates one of the available media encoders.

In some embodiments, the resource manager 118 may also track which users, channel owners, and web events are allocated which resources. The tracking information may then be used to determine where control data should be routed. For example, the resource manager 118 may know that webcast (i.e., web event) ID#3 is assigned to media encoder #15, so when a presenter associated with webcast ID#3 clicks on "go to next slide," the corresponding control data to change to the next slide will be sent to media encoder #15.

In further embodiments, the resource manager 118 may be configured to dynamically reallocate resources if a resource fails. For example, if media encoder #15 fails during a live web event, the resource manager 118 may automatically reallocate the encoding process to media encoder #17.

It should be noted that the environment 100 of FIG. 1 is exemplary. Alternative embodiments may comprise additional or fewer elements and still fall within the scope of various embodiments. For example, any number of channel owner devices 106, presenter devices 108, and subscriber devices 116 may be present in the environment 100 at any one time. Furthermore, the channel management system 102 may be comprised of more servers. For example, regional management servers 110 may be provided.

Figure 2:
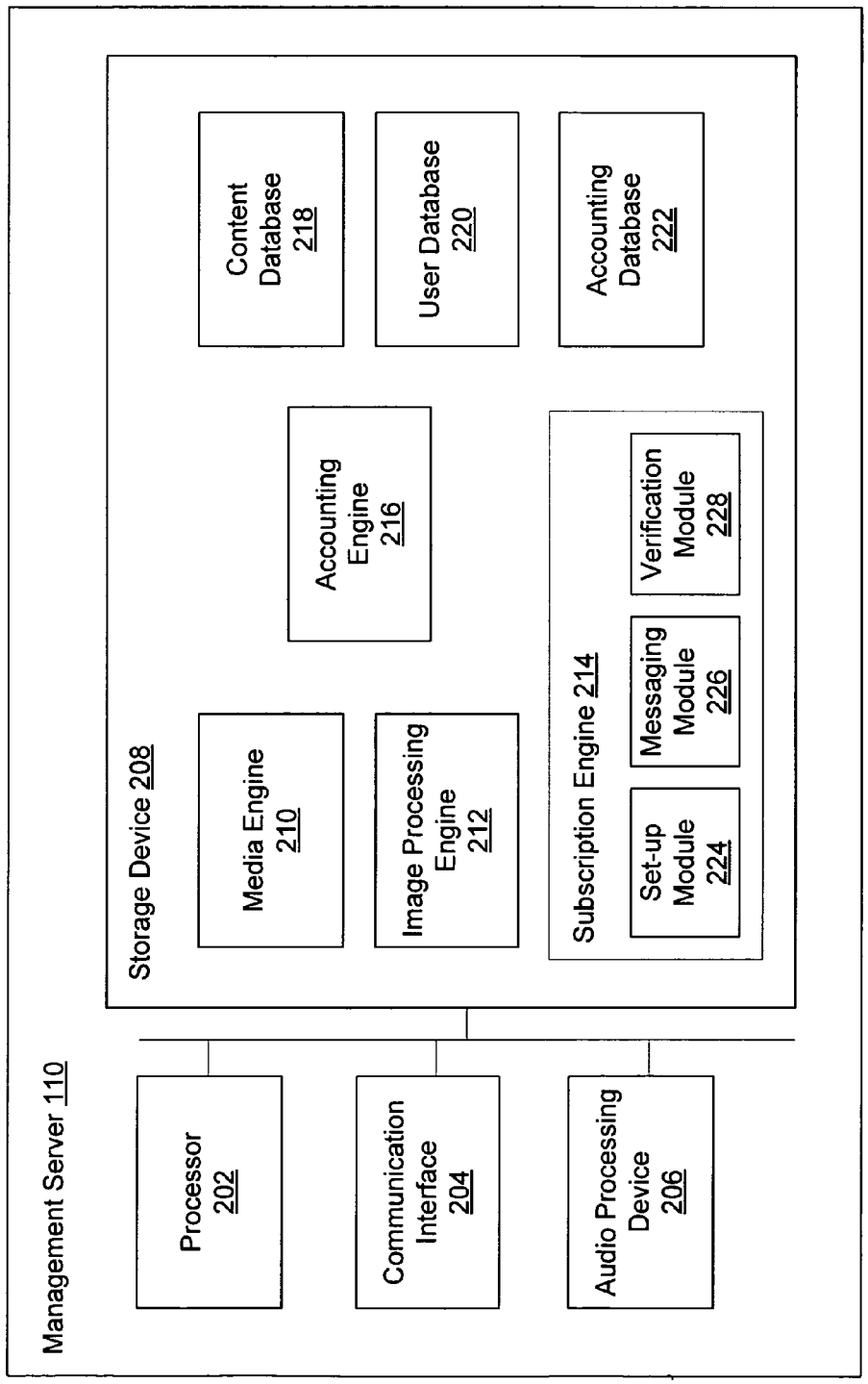
FIG. 2 is a block diagram of an exemplary management server.

Referring now to FIG. 2, an exemplary management server 110 is shown. The management server 110 is configured to provide the web event to the channel players, such as a presentation by one or more presenters, as discussed herein. In exemplary embodiments, the live web event is provided to the channel players in substantially real-time. In exemplary embodiments, the management server 110 may encode content of each live web event. This encoding may be performed on-the-fly. That is, for example, live audio data may be encoded into a formatted audio stream that is optimized for communication network 104 distribution. The formatted audio stream may then be synchronized with one or more presentation events during the live web event (e.g., webcast) by injecting control data associated with the presentation event. In some embodiments, the management server 110 may also insert a delay into the formatted audio stream to perform the synchronization.

The exemplary management server 110 may comprise a processor 202, a communication interface 204, an audio processing device 206, and at least one storage device 208. It should be noted that while all these components and associated functionalities are described as operating within a single management server 110, various embodiments contemplate having more than one server for providing the components and functions of the management server 110 and/or more than one of each of the engines, modules, or components within the management server 110. Furthermore, the various components of the channel management system 102 may comprise their own servers coupled in communication (e.g., embodiment of FIG. 8).

In exemplary embodiments, the communication interface 204 is configured to interface the management server 110 with the various networks and servers. In one embodiment, the communication interface 204 comprises a VoIP client for directly receiving audio or video including the live audio data from the presenter device 108 via the communication network 104. In other embodiments, the communication interface 204 comprises a VoIP client for receiving the live audio data from the PBX server 114. In these embodiments, the live audio data from one or more presenter devices 108 may be received via various PSTN or VoIP protocols (e.g., SIP G.711 or other similar protocols). Alternatively, audio data (e.g., high definition audio) may be received from the presenter. In yet another alternative embodiment, a plurality of independent audio streams (e.g., from individual channels) from each presenter may be received from the PBX server 114.

According to exemplary embodiments, the audio processing device 206 is enabled to apply gain control to the received audio data and provide the processed audio to a media engine 210 for encoding. By using the audio processing device 206, performance requirements of an encoder of the media engine 210 may be reduced since there is no need to transcode the audio into a correct format. In some embodiments, the audio processing device 206 may comprise a sound card. In alternative embodiments, the audio processing device 206 may comprise software which eliminates the need for the sound card. In yet another embodiment, the PBX server 114 may perform protocol conversion (e.g., into a format that is compatible with subscriber devices 116), thus eliminating the need to transcode the audio.

The live audio data received from each of the presenters may be encoded, as discussed herein, in order to create a formatted audio stream optimized for communication network 104 distribution. The formatted audio stream may then be synchronized with presentation events such as pre-recorded images by injecting control data associated with the presentation event in order to generate the live web event, such as presentation about financial planning. The web event is then distributed to an audience, such as the subscribers subscribing to the particular channel on which the financial planning presentation is being offered.

The storage device 208 may comprise one or more devices which function as memory or storage for the management server 110. The exemplary storage device 208 may comprise the media engine 210, an image processing engine 212, a subscription engine 214, an accounting engine 216, and a plurality of databases. These databases may comprise a content database 218, a user database 220, and an accounting database 222.

The exemplary media engine 210 is enabled to provide live web events and/or requested past web events to subscriber devices 116. Additionally, the media engine 210 encodes live audio data and injects control data associated with a presentation event to generate a combined formatted stream. In exemplary embodiments, the control data does not comprise the presentation event, but a pointer to the presentation event in the content database 218. The media engine 210 may be further configured to allow channel owners and/or presenters to establish web events on a channel. The media engine 210 will be discussed in more details in connection with FIG. 3 below.

In some embodiments, a delay may be introduced into a live audio track (e.g., the formatted audio stream) in order to compensate for latency associated with control data processing. Because there may be less delay in the audio track than in a web interface which delivers control data, the delay may be used to off-set the experience. For example, a two second delay may be introduced into the formatted audio stream in order to allow a slide change instruction (i.e., slide change control data) to be processed by a web browser of a subscriber (e.g., obtain the next slide from the content database 218). This delay may be introduced by the media engine 210 in accordance with one embodiment. Alternatively, the audio processing device 206 may introduce the delay.

In order to handle a plurality of subscribers accessing one or more live web events at the same time, the media engine 210 may utilize a data push model during the live event. In one example, once a live web event has begun, the media engine 210 pushes content to the subscribing channel players. As a result, during the live web event, the users of the channel players do not, in various embodiments, send commands (e.g., refresh commands or commands for the next slide) to the media engine 210.

In various embodiments, the management server 110 tries to limit data pulls. Prior to the live event, the subscriber may pull (e.g., transmit a request) for data until a data stream is received. When a state change occurs (e.g., an interruption in the delivery of the event) during an event, a file may be generated by the media engine 210 which represents the state change (e.g., a notice to the subscribers that an interruption has occurred). In various embodiments, the user may be placed back in a "pull mode" thereby requesting data until the live event can be reestablished. In one example, the media engine 210 provides a message to all requests for data (i.e., "pulls" from the subscribers) indicating the status of the live event.

The image processing engine 212 may be configured to receive and process any images that will be used in live web events. Images can include, but are not limited to, pictures, videos, individual slides, slide shows, animation, or any combination of these images. In some embodiments, the images may comprise slides that will be presented during the live web events. Accordingly, the images may be pre-loaded by the presenter via the channel application on the presenter device 108. In one embodiment, the image processing engine 212 comprises a PowerPoint converter which converts an uploaded PowerPoint presentation into static images. In some embodiments, the images may be stored in the content database 218 for access by subscriber devices during the live web event in response to control data.

During a live web event, commands affecting presentation events (e.g., image or slide changes, providing questions or votes) are received from the presenter and processed by the media engine 210 in accordance with one embodiment. Thus, for example, if the presenter indicates (e.g., clicks on selection) to move to a next slide, control instruction is received from the channel application associated with the presenter device 108. In embodiments comprising a plurality of media engines 210 or media encoders 306, the resource manager 118 may receive the control instruction and determine which media engine 210 (or media encoder within the media engine 210) should receive the control instruction. The media encoder 306 may then inject corresponding control data for moving to the next slide into the formatted audio stream.

The exemplary subscription engine 214 is configured to manage channel subscribers and/or their subscriber devices 116. In various embodiments, the subscription engine 214 may comprise a set-up module 224, a messaging module 226, and a verification module 228. Other modules associated with subscribers, subscriber devices 116, and subscriber services may be provided.

The first time a user accesses the channel management system 102 (e.g., access any channel associated with the channel management system 102), the user may be requested to join the channel management system network. Accordingly, the set-up module 224 may provide questions and request user information from the user. The user information may then be stored in the user database 220 and associated with the user. As a result, an account may be established for each user.

In one embodiment, the establishment of the account will cause the user to be a subscriber to a current channel being accessed. Thus, the user is now a channel subscriber. As a subscriber, the user may have access to some or all content within the channel. In one example, the subscriber device 116 (associated with the subscriber with the account) can access all past, archived events of the channel through the channel player. The subscriber device 116 can also receive a live event of the channel through the channel player. Additionally, the subscriber device 116 may be provided with a list of future, scheduled events for the channel player.

In accordance with one embodiment, preferences may be set such that when the subscriber returns to the subscribed-to channel, the management server 110 will recognize the subscriber device 116 and/or the subscriber. As such, the subscriber device 116 may directly access the channel player content without having to identify the subscriber to the verification module 228 or log in.

When the user accesses a different channel which the user has not subscribed to, the subscription engine 214 may automatically verify the user's identity via the verification module 228 using stored user information. However, the user, in accordance with some embodiments, may need to accept terms and conditions of the new channel in order to subscribe to the new channel. In one example, selection of a subscription button will activate the subscription to that new channel. Because the channel management system 102 already has the user information stored, the user may not need to provide any further information to subscribe to the new channel.

In some embodiments, the messaging module 226 may be provided to notify subscribers of upcoming events. For example, an invitation may be sent to the subscriber device 116 of a subscriber to the channel to attend the next event. In some embodiments, the invitation may comprise a link to access the channel player, the channel, and/or the event.

The exemplary accounting engine 216 is configured to manage channel owners and/or channel owner devices 106. In exemplary embodiments, the channel owner may pay a fee for establishing a channel, advertising the channel, having audience participation (e.g., pay the audience for attending and responding) and/or for other functions and services provided by the channel management system 102. The channel owner may also receive fees from the audience, from purchased content, or from sponsors, for example. The accounting engine 216 may maintain records of all these fees.

The accounting engine 216 may also be configured to allocate resources to the channels of the channel owner. For example, a particular channel may be provided a certain amount of content database 218 storage space based on a subscription plan of the channel owner. The information associated with the accounting engine 216 may be stored in the accounting database 222.

Figure 3:
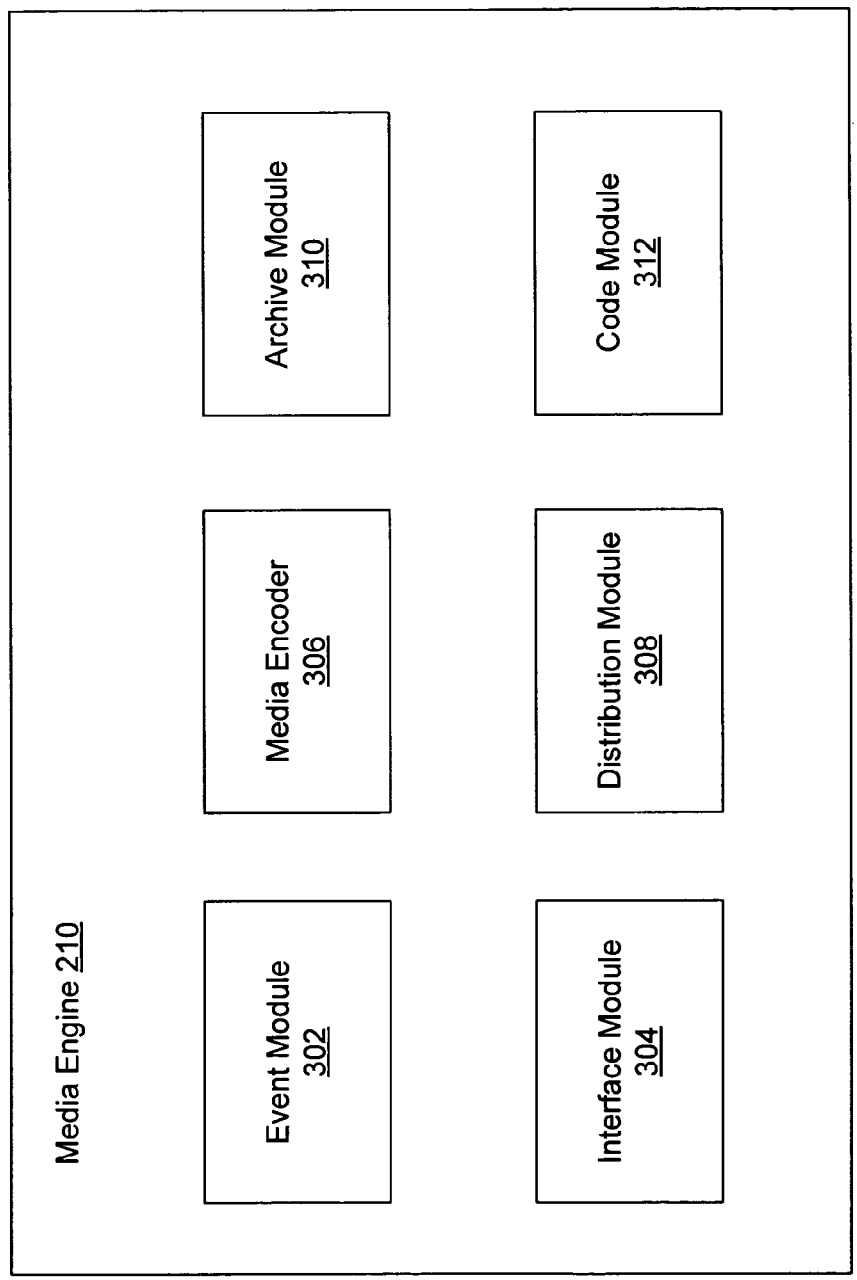
FIG. 3 is a block diagram of an exemplary media distribution engine.

Referring now to FIG. 3, the media engine 210 is shown in more detail. In exemplary embodiments, the media engine 210 is enabled to provide live web events and requested past web events to subscriber devices 116 via the channel player. In accordance with one embodiment, the media engine 210 comprises an event module 302, an interface module 304, a media encoder 306, a distribution module 308, an archive module 310, and a code module 312.

In exemplary embodiments, the event module 302 is configured to allow the channel owner (e.g., via the channel owner device 106) and/or the presenter (e.g., via the presenter device 108) to establish web events on a channel. The event module 302 may provide an interface which allows the channel owner or presenter to enter details of a new event. The details may comprise title of the web event, description, event time, etc. The event module 302 may also allow the presenter device 108 to upload images such as slides and/or videos, to the management server 110 prior to the live event. In an alternative embodiment, the image processing engine 212 may perform the function of uploading images to the management server 110. Additionally, the event module 302 may aggregate a list of upcoming and archived events.

The exemplary interface module 304 provides various interfaces on the channel player. One such interface comprises a listing of one or more web events. The web events may comprise any combination of past, current, and/or future events.

In exemplary embodiments, the media encoder 306 is configured to encode the live audio into a formatted audio stream and inject control data into the formatted audio stream to create the live web event, and provide the synchronized live web event to the subscriber devices 116. The media encoder 306 may comprise a VoIP component and a transcoder component. In some embodiments, the media encoder 306 communicates with a conference or conference bridge (e.g., at the PBX server 114). The VoIP component then takes the live audio from the conference. In some embodiments, the live audio may be sent to the audio processing device 206 for processing.

In exemplary embodiments, the media encoder 306 transcodes the live audio into an appropriate network/destination format. This transcode may be performed by a single encoder 306 capable of generating more than one format out, or a plurality of media encoders 306 may be coupled to the conference (e.g., one media encoder 306 for each format type). The transcoder component may also inject control data (e.g., slide information, slide changes, live votes, and status information) into the formatted audio stream. The transcoder component may be coupled to the audio processing device 206 in accordance with one embodiment.

In some embodiments, the audience may provide feedback during the presentation, such as level of satisfaction. The feedback may be represented in the live web event visually or audibly, such as by happy faces or applause. The presenters may also receive the feedback as each presenter is presenting. The associated feedback control data may be injected into the formatted audio stream as additional control data by the media encoder 306. As a result, the subscriber device 116 and/or the presenter device 108 receiving the feedback control data may obtain (e.g., from the content database 218) and provide the feedback.

In a further embodiment, the media encoder 306 may be coupled to each individual presenter within a conference. Thus, the media encoder 306 will receive audio individually from each presenter rather than an aggregated conference where all presenters are heard at the same time. This embodiment, allows the management server 110 to mix the audio in different configurations. For example, four individual audio feeds may be received by the media encoder 306, but only one of the feeds may be used to generate the formatted stream for the live event. However, all four presenters may be able to hear each other via the conference. For example, three out of four presenters' audio may be removed from the web event when these presenters are not presenting so that the three non-presenting presenters may communicate with one another via the PBX server 114 without the audience's knowledge while the fourth presenter carries on his or her presentation.

The distribution module 308 is configured to provide content to the subscriber devices 116 and presenter devices 108. The content may comprise live and archived events as well as presentation events associated with control data. For example, if the subscriber device 116 receives a combined formatted stream having control data indicating display of a next slide, the distribution module 308 will, upon receiving a request from the subscriber device 116 for the next slide, provide the next slide to the subscriber device 116.

In exemplary embodiments, the live web event may be archived by the archive module 310 and stored immediately or relatively soon after the distribution of the live web event. The archived event may be stored in the content database 218. The listing of the web events on the channel may then be updated by the interface module 304 to indicate that the previous live web event is now an archived web event.

Subsequently, subscriber devices 116 may access and request archived web events via the distribution module 308. In one embodiment, when the subscriber selects an archived web event from a list provided in the channel, the request may be received by the distribution module 308. The archive module 310 may then access the content database 218 to obtain the requested archived web event and provide it to the distribution module 308. The archived web event is then streamed or otherwise downloaded to the channel player of the subscriber device 116 requesting the archived web event. It should be noted that the functions of the interface module 304 and the distribution module 308 may be combined within a single module.

The exemplary code module 312 is configured to generate the embeddable code which provides access to the channel and provides an instance of the channel player on a subscriber device 116. In accordance with one embodiment, the code module 312 will generate the code based, in part, on information provided by the channel owner. The code may comprise generic coding to provide the channel player on a browser of the user or subscriber device 116 activating the code. The code may also comprise a specific tag to indicate a particular channel. In some embodiments, the code module 312 is configured to provide the code to support channel players on different browsers. In further embodiments, embedded code may comprise a tag that takes a user directly to a webcast. For example, the tag may comprise a channel ID and webcast ID. Activation of this tag may take the user directly to the webcast identified by the webcast ID.

It should be noted that the management server 110 of FIG. 2 and the media engine 210 of FIG. 3 are exemplary. Alternative embodiments may comprise additional or fewer modules and still fall within the scope of various embodiments. Further, the functions of the modules may be combined within fewer modules and still fall within the scope of embodiments. In some embodiments, the various modules may comprise one or more servers.

Figure 4:
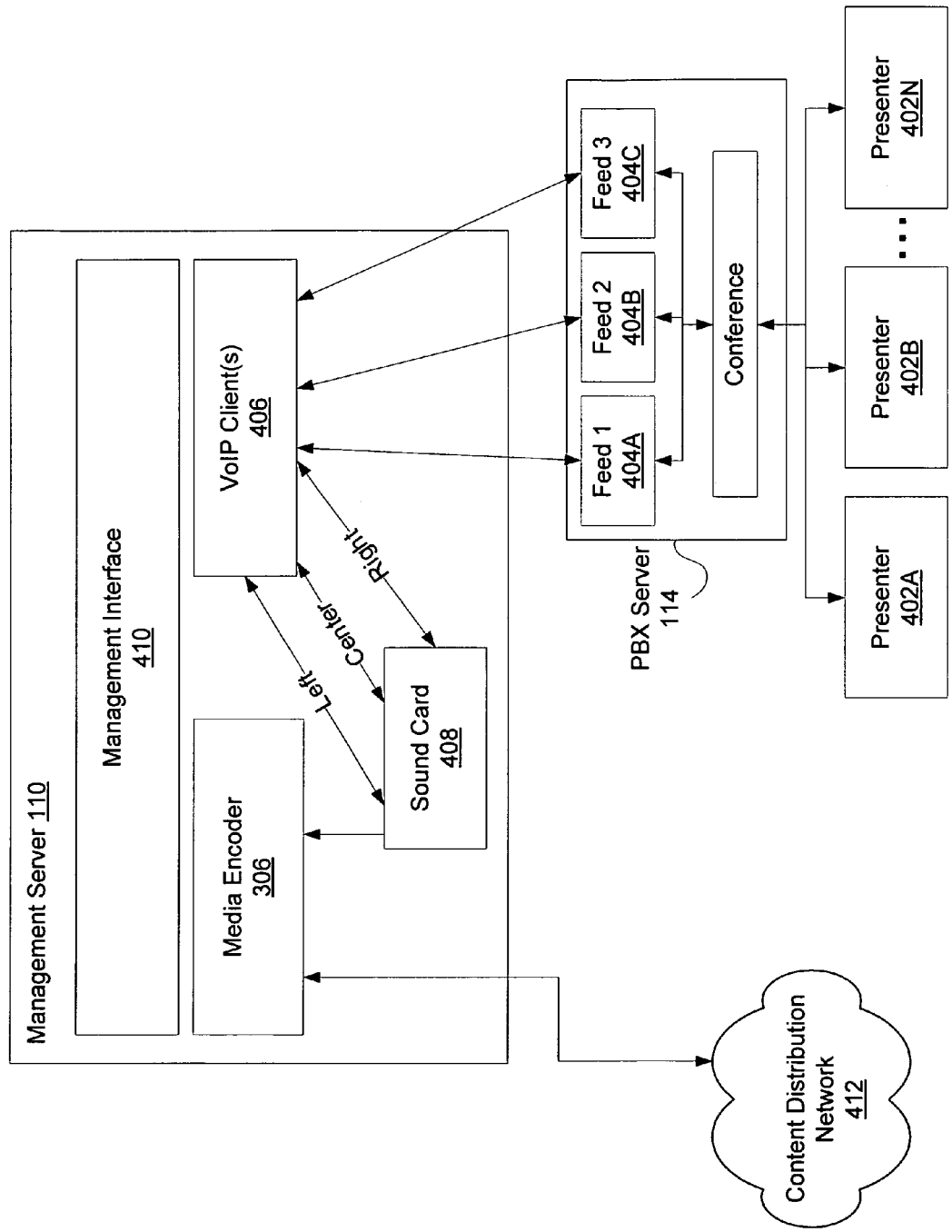
FIG. 4 is a block diagram of an exemplary environment for generating a stereo mix of audio from various presenters.

FIG. 4 is a block diagram of an alternative exemplary environment whereby a stereo mix of audio from a plurality of presenters may be generated. In this embodiment, the plurality of presenters 402 provides live audio data to the PBX server 114. The live audio may be provided via PSTN, VoIP, or any other methods. The PBX server 114 may conference the audio data so that two or more of the plurality of presenters 402 can hear one another.

In this embodiment, a plurality of feeds 404, such as feed 1 404A, feed 2 404B, and feed 3 404C, are utilized to transmit the audio data from the PBX server 114 to a VoIP client 406. In one embodiment, the VoIP client 406 may comprise the communication interface 204. Each feed 404 may correspond to a different presenter 402. As such, the media encoder 306 may be coupled to each individual presenter within a conference. Thus, the media encoder 306 may receive audio individually from each presenter rather than an aggregated conference where all presenters are heard at the same time. This embodiment allows the management server 110 to mix the audio in different configurations. For example, four individual audio feeds may be received by the media encoder 306, but only one of the feeds may be used to generate the formatted stream for the live event. However, the presenters may be able to hear each other via the conference.

The VoIP client 406 sends the received audio data to a sound card 408. In one embodiment, the sound card 408 may comprise the audio processing device 206. In various embodiments, the sound card 408 may apply gain control to the received audio data and provide the processed audio to a media encoder 306. By using the sound card 408, performance requirements of the media encoder 306 may be reduced since there is no need to transcode the audio into a correct format. In alternative embodiments, the management server 110 may comprise software which eliminates the need for the sound card 408.

The VoIP client 406 and the media encoder 306 are associated with a management interface 410 in FIG. 4. In one embodiment, the management interface 410 may comprise the functionality of the processor 202, the audio processing device 206, the image processing engine 212, and the media engine 210.

In exemplary embodiments, the media encoder 306 may encode the live audio from the individual channels 404 into a stereo mix of live audio. The formatted audio stream (e.g., formatted live audio from the various channels 404) may then be synchronized by the media encoder 306 with injected control data and communicated to a content distribution network 412. In some embodiments, the content distribution network 412 comprises the communication network 104.

Figure 5:
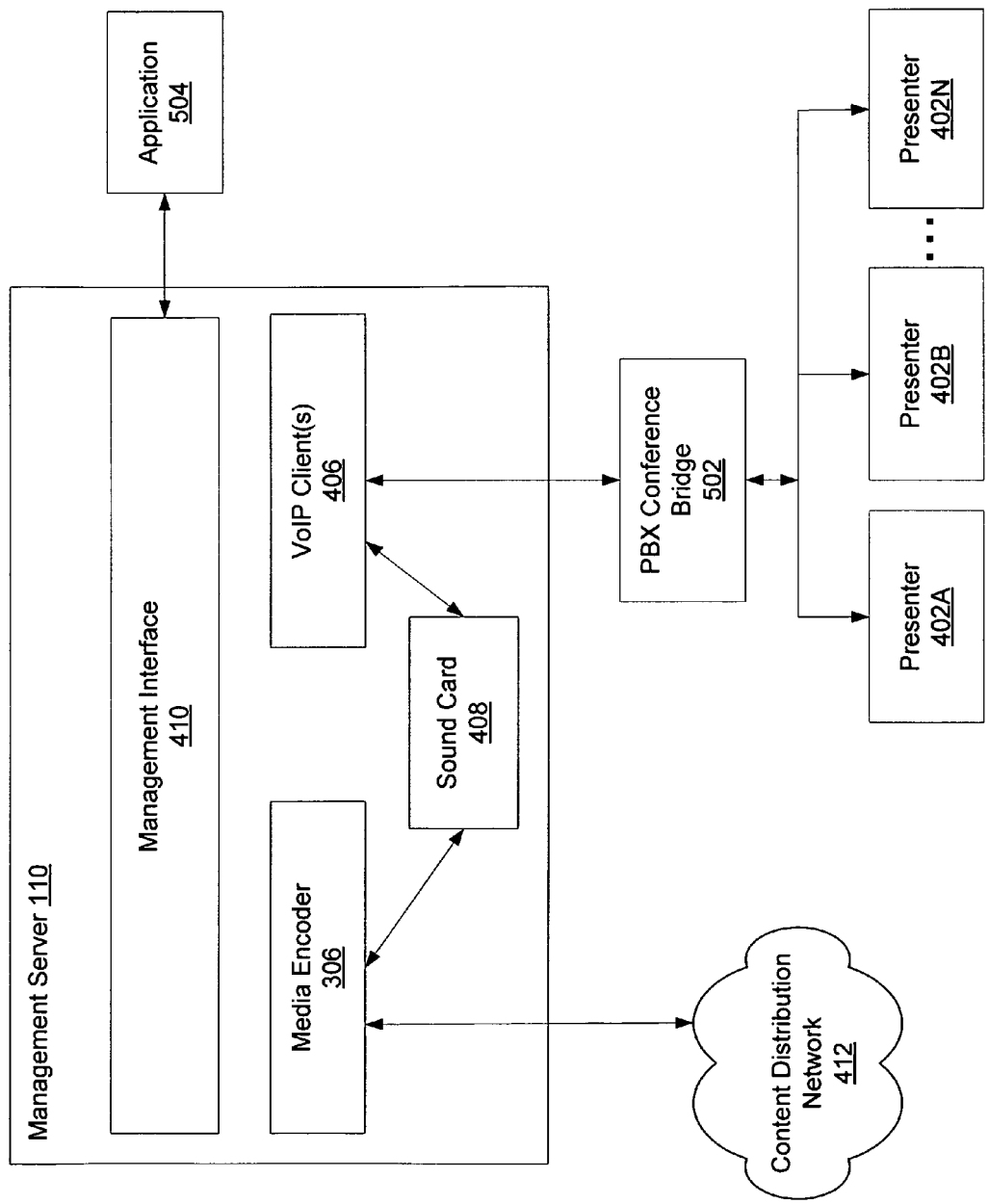
FIG. 5 is a block diagram of an exemplary environment for encoding a standard conference call.

FIG. 5 is a block diagram of an alternative exemplary environment for encoding a standard conference call. The plurality of presenters 402 may each couple to a PBX conference bridge 502. The presenters 402 may be coupled via PSTN, VoIP, or any other communication mechanism. In various embodiments, the VoIP client 406 couples to the PBX conference bridge 502. In this way, the VoIP client 406 may receive the audio from the PBX conference bridge 502. In some embodiments, the VoIP client 406 couples to the PBX conference bridge 502 and obtains the live audio using a VoIP protocol (e.g., SIP G.711).

The audio data from the VoIP client 406 may then be routed to the sound card 408. The sound card 408 shown in FIG. 5 may, in some embodiments, apply gain control before the audio data is communicated to the media encoder 306 for encoding into the formatted audio stream.

An application 504 may send additional control instructions from the presenters 402. These control instructions may comprise, for example, a slide change instruction, status information, feedback instructions, and so forth. Corresponding control data (to perform the control instruction) may be injected into the formatted audio stream in order to synchronize a presentation event associated with the control data with the live audio. The results may then be output to the content distribution network 412 (e.g., communication network 104).

Figure 6:
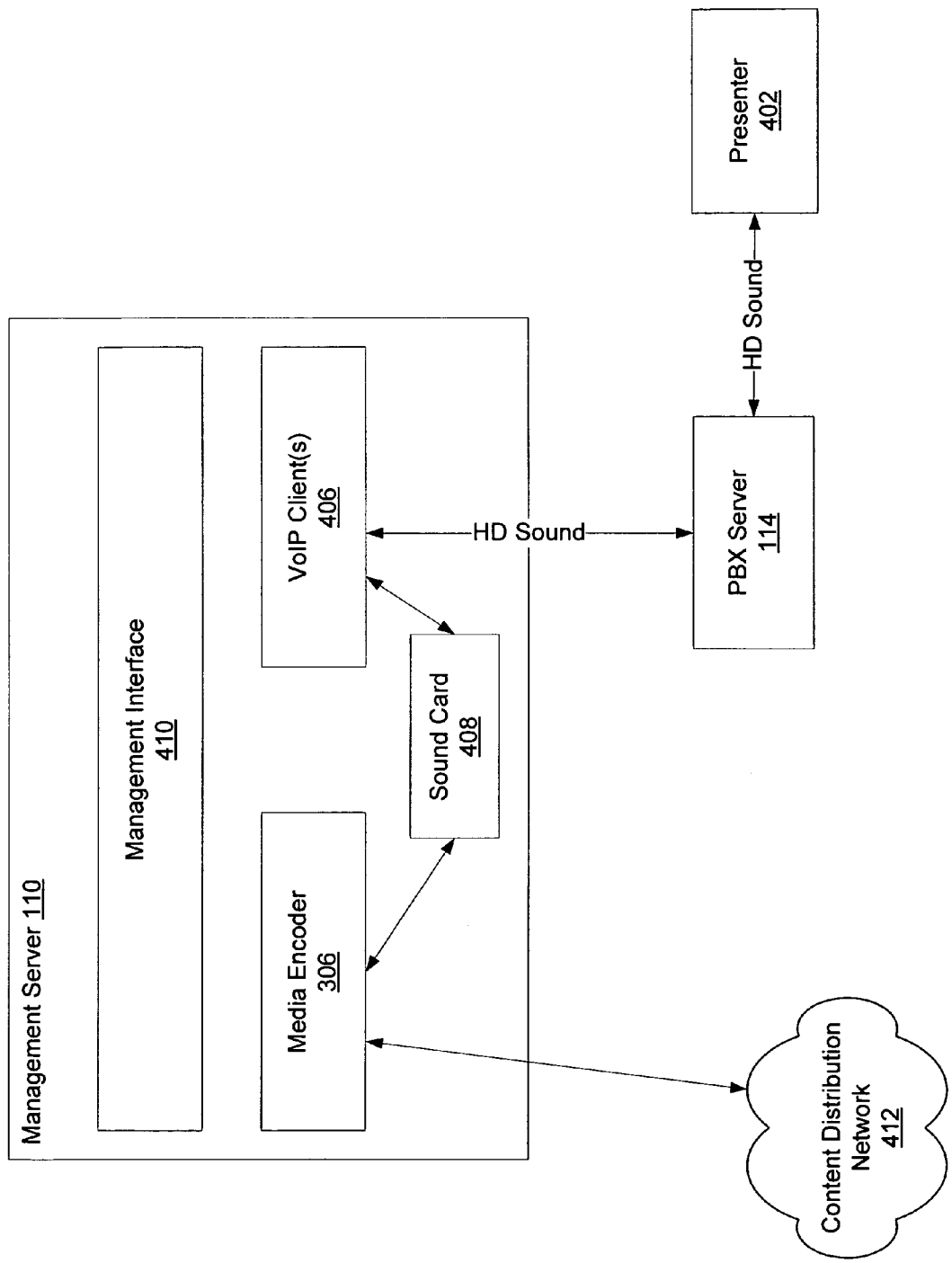
FIG. 6 is a block diagram of an exemplary environment for live encoding of a high definition call.

FIG. 6 is a block diagram of an alternative exemplary environment for live encoding of a high definition call. In this embodiment, the presenter 402 calls into the PBX server 114 with high definition sound. The PBX server 114 passes the high definition sound through to the VoIP client 406, which communicates the high definition sound to the sound card 408. After any gain control processing, the processed audio is forwarded to the media encoder 306 for encoding into the formatted audio stream. The media encoder 306 preserves the high definition sound for distribution by the content distribution network 412 (e.g., communication network 104).

According to alternative embodiments, the PBX server 114 may conference the high definition sound from the presenter 402 with high definition sound or other types of audio data from the other presenters 402. It should be noted that any number of presenters 402 may be present in any of the embodiments of FIG. 4-FIG. 6.

Figure 7:
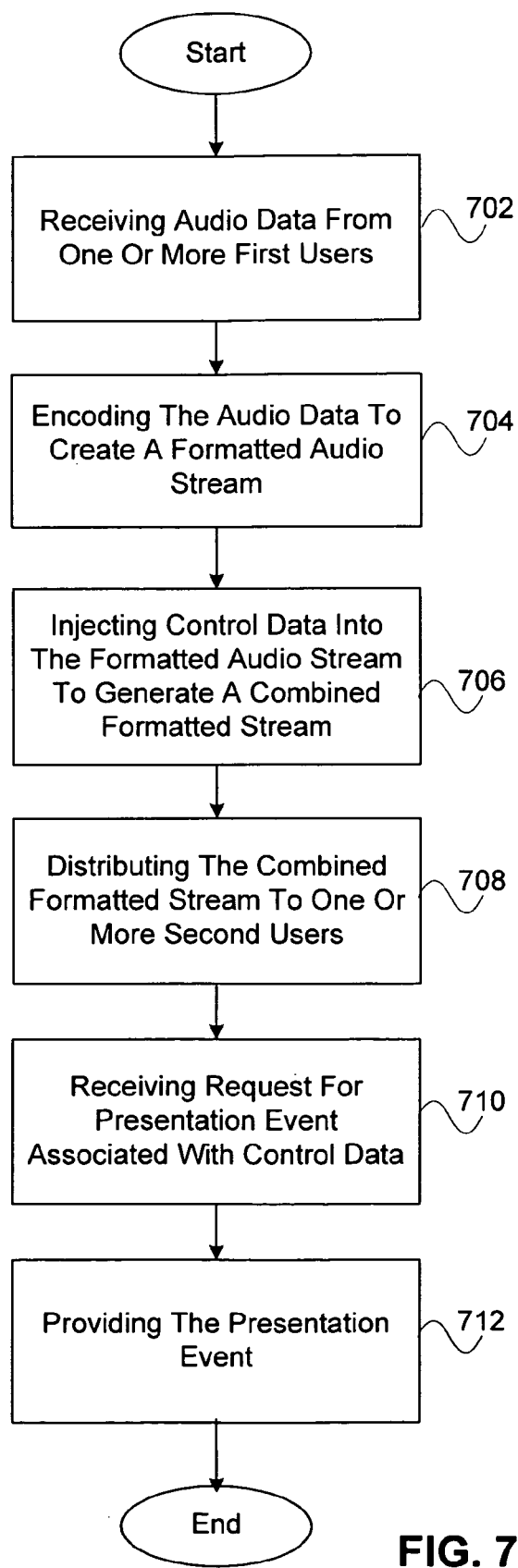
FIG. 7 is a flow diagram showing an exemplary process for integrating phone communication into a web event.

FIG. 7 is a flow diagram showing an exemplary process for integrating live audio communication with presentation events to create a live web event. At step 702, live audio data is received from one or more presenters. As discussed herein, the live audio data may be received via PSTN, VoIP, by any medium or in any format. In one embodiment, the live audio data may be received by the PBX server 114 associated with the channel management system 102.

At step 704, the audio data is encoded in order to create a formatted audio stream. The PBX server 114, and/or any module associated with the channel management system 102, may initially receive the audio data. If the audio data received is analog, the audio data may be converted into digital form. Otherwise, if the audio data received is already in digital form, it may be passed through to a sound card and/or the media encoder 306. The media encoder 306 may encode the audio data in order to create a formatted audio stream appropriate for a format required by a destination. Various web formats are supported by the media encoder 306.

At step 706, the formatted audio stream may be injected with control data associated with one or more presentation events to generate a combined formatted stream. The presentation event may comprise, for example, a slide change, slide information, live votes, audience feedback, and status information including a current slide. For example, the one or more subscribers may provide feedback, such as by voting, selecting happy or sad faces, or by any other feedback mechanism. The presenters 402 may receive the feedback via visual cues, such as on screens available to the presenters 402 and/or via audio, such as applause. The control data for providing the feedback may be injected into the formatted audio stream, for example, so audience members can also hear the feedback. In yet other embodiments, audio enhancements may be made as a result of real-time feedback. For example, if a plurality of audience feedback indicates that Presenter A is not loud enough, the media encoder may boost the volume for the portion of the formatted stream associated with Presenter A.

In exemplary embodiments, the control data comprises a current state of a web event. (e.g., what is the current slide, how many users are there, are there any new questions). The control data may be stored in a small text file in accordance with one embodiment. At a predetermined time period (e.g., every few seconds) the control data file may be grabbed by the media encoder 306 and transmitted (e.g., injected) alongside the formatted audio data (e.g., the formatted audio stream). If the state has not changed, the same unchanged state file (e.g., control data file) may be retransmitted and no change will be triggered at the user's device. If something changes the state (e.g., "next slide" command), the user's device (e.g., channel player interface) will receive the new control data file and respond accordingly (e.g., send request for new information).

In exemplary embodiments, an audio delay may be introduced, for example, by the media encoder 306 to allow synchronization of the formatted audio stream with the presentation events (e.g., change in images). Because a web path comprising the presentation events (e.g., images or image data) may be slower than an audio path (e.g., path via which the combined formatted stream travels), latency may occur. Thus, the delay allows the synchronization of the live audio with the presentation event. In alternative embodiments, the media encoder 306 may slow some portions of the combined formatted stream down more than others or speed some portions up.

At step 708, the combined formatted stream is distributed to one or more subscribers. The one or more subscribers comprise audience members according to exemplary embodiments. The audience may subscribe to the channel on which the web event is being offered, such as a presentation on healthy eating habits, for example.

In exemplary embodiments, synchronization of the live audio and the presentation events occurs since the input audio and the control data may be received, formatted, and streamed by the media encoder 306 in real time. For example, if a presenter says " . . . and on the next slide . . . ", while clicking to generate the control data to signal the slide change, the audio "next slide" and the control data may enter the encoder substantially at the same time. The audio data and control data may be put into a single combined formatted stream at approximately the same time to be transmitted, or with a delay as discussed above. As a result, the audio "next slide" and the next slide are received simultaneously.

In step 710, a request for a presentation event associated with the control data is received. Upon receiving the formatted combined stream, the subscriber device 116 may send the request for the presentation event identified by the control data. As previously discussed, the control data is not the presentation event but a pointer to the presentation event. In one embodiment, the request is received by the distribution module 308, which accesses, or instructs access to, the content database 218 to provide the presentation event in step 712.

Figure 8:
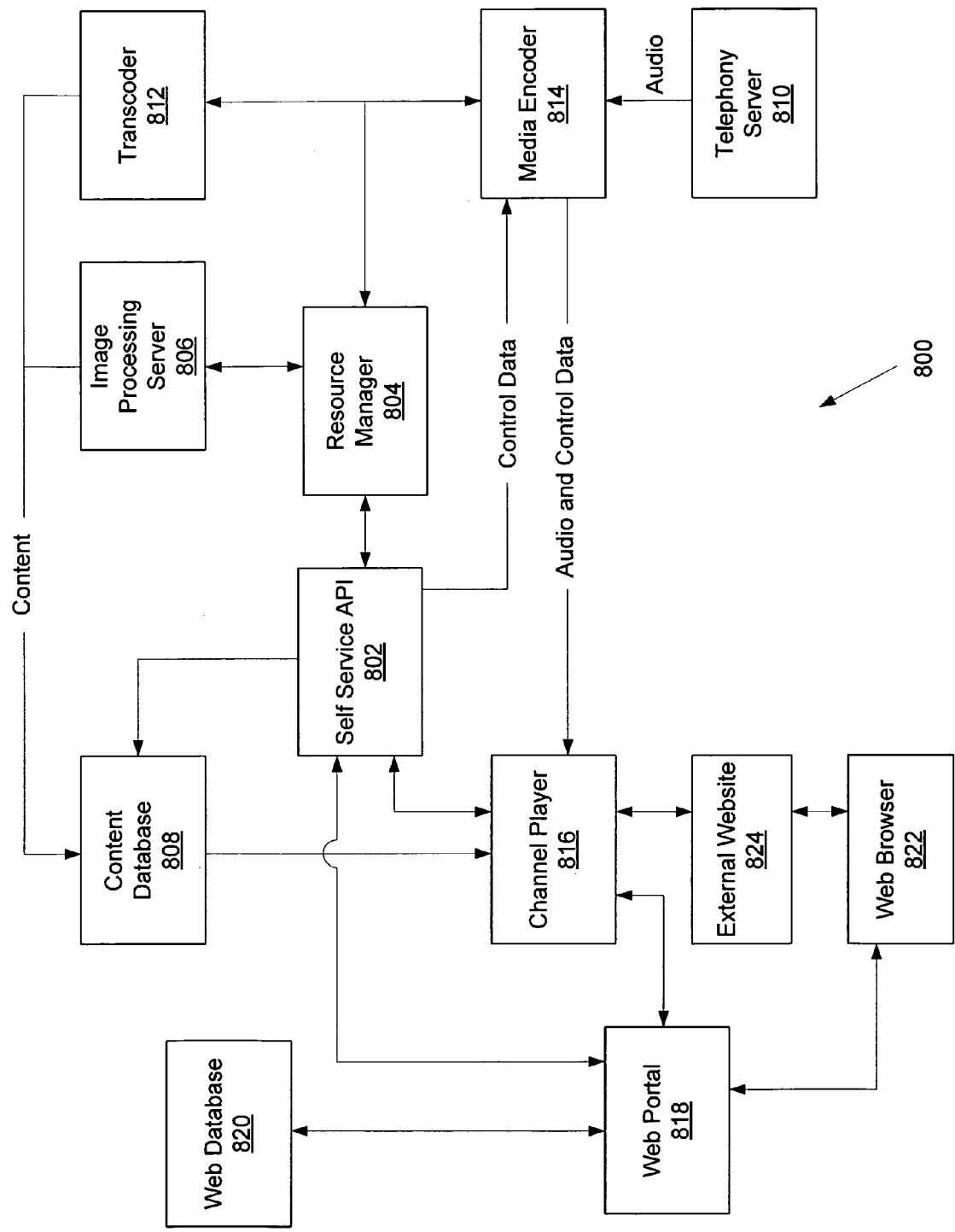
FIG. 8 is a block diagram of an alternative channel management system in communication with user devices.

Referring now to FIG. 8, an alternative embodiment 800 of the channel management system 102 in communication with a user device (e.g., subscriber device 116) is provided. The alternative embodiment 800 provides a plurality of servers and databases coupled together to perform the processes as discussed in accordance with the embodiment of FIG. 1-FIG. 7. The present embodiment may comprise a self service API 802, a resource manager 804, an image processing server 806, a content database 808, a telephony server 810, a transcoder server 812, media encoder 814, a channel player 816, a web portal 818, and web database 820 coupled in communication together. The live web events may be provided to a web browser 822 of one or more presenters and subscribers. The resource manager 804 operates as discussed in conjunction with FIG. 1 above. The image processing server 806 and the content database 808 function as discussed above in connection with the image processing engine 212 and content database 218 of FIG. 2. The media encoder 814 (server) is similar to the media encoder 306 (module).

The self service API 802 is configured to coordinate communications between different components of the system. In some embodiments, the self service API 802 may create, modify, and catalog content in the content database 808 as well as allow the channel owner, channel provider, or presenters to set up web events for their associated channels. The self service API 802 may also read and write data to a reporting database.

The telephony server 810 is configured to receive audio data from the presenters. The telephony server 810 may comprise a communication interface 204, PBX server 114, a PBX conference bridge 502, and/or a similar device having similar functionalities.

The transcoder server 812 is configured to transcode the audio from the telephony server 810 into a formatted audio stream. In one embodiment, audio data may be received as .wav files and be converted into a .mp3 file. In the present embodiment, the transcoder server 812 is separate from the media encoder 814. As such, after the transcoder server 812 transcodes the audio data, the media encoder 814 may inject the control data.

In some embodiments, once a recorded live stream has been transcoded into .mp3 format, the control data is not injected into the .mp3 file. Instead, each control data event (i.e., presentation event) may be hard-coded into a static text file (e.g., a webcast configuration file), with each control data event having a time stamp that corresponds to when the control data event occurs during the live webcast. As the .mp3 is played back, its play time (i.e., progression through the .mp3 file) is constantly monitored. When a control data time point has passed, the channel player 816 interface carries out the appropriate action as coded in the configuration file. For example, data in the webcast configuration file may indicate that slide #3 was shown at 45 seconds into the live webcast. Therefore, when the .mp3 has played for 45 seconds, the channel player 816 interface will know (from the data written in the webcast configuration file) that it should then retrieve and load slide #3.

The channel player 816 comprises an interface configured to provide access to a channel comprising past, current, and future web events as well as live web events. The channel player 816 is discussed in more detail in U.S. patent application Ser. No. 12/004,532, entitled, "System and Method for Providing a Web Event Channel Player;" which is incorporated herein.

The web portal 818 may be a main online access point for web browsers 822 associated with the subscribers and/or presenters to the components of the embodiment 800. The web portal 818 may also comprise a main content delivery vehicle to the web browser 822. In accordance with exemplary embodiments, the web portal 818 is associated with the channel management system 102.

In a further embodiment, the web browser 822 may receive content via an external website 824. For example, a channel owner may embed the channel player 816 (e.g., a link to the channel player 816) into their own website (e.g., external website 824). It should be noted that the channel player 816 may be provided via other mechanism. For example, a downloadable desktop application may be utilized to provide access to the channel player 816.

In exemplary embodiments, the web database 820 stores data not associated with live event content. The web database 820 may include user data and associated accounting and billing information. The web database 820 may also include channel and web event catalogs. Alternatively, the channel and web event catalogs may be stored in the content database 808.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the channel management system 102 may employ any of the desired functionality set forth herein above and may be embodied with a plurality of modules or servers. Thus, the breadth and scope of a preferred embodiment should not be limited by any of the above-described exemplary embodiments.

What is claimed is:

1. A method for integrating live audio communication in a live web event comprising:
   receiving on a management server live audio data from a plurality of presenters, the received live audio data from each of the plurality of presenters via a separate feed;
   encoding using a media encoder on the management server, the received live audio data into formatted audio streams;
   receiving control instructions from the plurality of presenters and using the control instructions to generate control data, the control data comprising a current state of the live web event;
   synchronizing on the management server each of the formatted audio streams from the plurality of presenters with the control data without injecting the control data into the formatted audio streams by determining whether a predetermined period of time has passed; if the predetermined period of time has passed, transmitting the control data alongside the formatted audio streams; if the predetermined period of time has not passed, not transmitting the control data alongside the formatted audio streams; determining whether a change in a state of the control data has occurred; if the change in the state of the control data has occurred, transmitting new control data and updating content; if no change in the state of the control data has occurred, retransmitting the control data and not updating the content;
   generating a combined formatted stream comprising each of the formatted audio streams, the synchronizing further comprising generating a webcast configuration file;
   distributing from the management server the combined formatted stream to one or more users;
   receiving feedback from the one or more users;
   generating control data from the received feedback; and
   the media encoder automatically making an audio enhancement based on the generated control data from the received feedback.

2. The method of claim 1 further comprising receiving a request for data associated with the control data from one or more subscriber devices and providing the data to the one or more subscriber devices.

3. The method of claim 2 wherein the data is associated with a next image.

4. The method of claim 2 wherein the data is associated with audience feedback.

5. The method of claim 1 wherein the receiving on the management server of the live audio data comprises passing high definition audio through a VoIP client.

6. The method of claim 1 wherein the receiving on the management server of the live audio data comprises receiving the live audio data from a conference bridge.

7. The method of claim 1 further comprising allocating resources in order to perform the synchronization.

8. A system for integrating live audio communication in a live web event comprising:
   a processor;
   a communication interface in communication with the processor, the communication interface configured to receive on a management server live audio data from a plurality of presenters, the received live audio data from each of the plurality of presenters via a separate feed and receive control instructions from the plurality of presenters;
   an encoding module configured to encode on the management server the received live audio data into formatted audio streams;
   a media engine configured to use the control instructions to generate control data, the control data comprising a current state of the live web event, the control data being associated with at least one presentation event initiated by at least one of the plurality of presenters;
   the media engine configured to synchronize on the management server each of the formatted audio streams from the plurality of presenters with the control data without injecting the control data into the formatted audio streams by determining whether a predetermined period of time has passed; if the predetermined period of time has passed, transmitting the control data alongside the formatted audio streams; if the predetermined period of time has not passed, not transmitting the control data alongside the formatted audio streams; determining whether a change in a state of the control data has occurred; if the change in the state of the control data has occurred, transmitting new control data and updating content; if no change in the state of the control data has occurred, retransmitting the control data and not updating the content;
   the media engine configured to create on the management server a combined formatted stream comprising each of the formatted audio streams, and generate a webcast configuration file;
   a distribution module configured to provide the combined formatted stream from the management server to one or more subscribers;
   receiving feedback from the one or more subscribers;
   generating control data from the received feedback; and
   the encoding module automatically making an audio enhancement based on the generated control data from the received feedback.

9. The system of claim 8 further comprising an image processing engine configured to process images on the management server to be used in the live web event.

10. The system of claim 8 wherein the distribution module is further configured to distribute data associated with the control data.

11. The system of claim 8, wherein the media engine is further configured to introduce a delay to the formatted audio streams to allow synchronization of the received live audio data with the at least one presentation event.

12. The system of claim 8 further comprising a resource manager configured to allocate resources to enable distribution of web events.

13. The system of claim 8 further comprising a telephony server configured to receive live audio data from the plurality of presenters.

14. The system of claim 8, the webcast configuration file comprising a time stamp corresponding to when the at least one presentation event occurs during the live web event, the media engine executing an action indicated by the control data when a control data time point elapses.

15. A non-transitory computer readable medium having embodied thereon a program, the program providing instructions for a method for integrating live audio communication in a live web event, the method comprising:

receiving on a management server live audio data from a plurality of presenters, the received live audio data from each of the plurality of presenters via a separate feed;

encoding using a media encoder on the management server, the received live audio data into formatted audio streams;

receiving control instructions from the plurality of presenters and using the control instructions to generate control data, the control data comprising a current state of the live web event;

synchronizing the formatted audio streams from the plurality of presenters with the control data by determining whether a predetermined period of time has passed; if the predetermined period of time has passed, transmitting the control data alongside the formatted audio streams; if the predetermined period of time has not passed, not transmitting the control data alongside the formatted audio streams; determining whether a change in a state of the control data has occurred; if the change in the state of the control data has occurred, transmitting new control data and updating content; if no change in the state of the control data has occurred, retransmitting the control data and not updating the content;

combining on the management server each of the formatted audio streams from each of the plurality of presenters with the control data to generate a combined formatted stream comprising each of the formatted audio streams, the synchronizing further comprising generating a webcast configuration file;

distributing from the management server the combined formatted stream to one or more users;

receiving feedback from the one or more users;

generating control data from the received feedback; and the media encoder automatically making an audio enhancement based on the generated control data from the received feedback.

16. The method of claim 1, the webcast configuration file comprising a time stamp corresponding to when at least one presentation event occurs during the live web event, the management server executing an action indicated by the control data when a control data time point elapses.

17. The non-transitory computer readable medium of claim 15, the webcast configuration file comprising a time stamp corresponding to when at least one presentation event occurs during the live web event, the management server executing an action indicated by the control data when a control data time point elapses.

\* \* \* \* \*